US012237559B1

(12) United States Patent
Wilson et al.

(10) Patent No.: US 12,237,559 B1
(45) Date of Patent: Feb. 25, 2025

(54) ELECTROMAGNETIC SPLITTING COUPLER COMPRISING A TEM SIGNAL INPUT PORT COUPLED TO PLURAL TE10 SIGNAL EMITTER PORTS THROUGH A HOLLOW MANIFOLD AND AN ACCESSIBLE FLANGE

(71) Applicants: Douglas Mark Wilson, King George, VA (US); Blake Charles Duff, Fredericksburg, VA (US); Jon Cameron Pouncey, Fredericksburg, VA (US)

(72) Inventors: Douglas Mark Wilson, King George, VA (US); Blake Charles Duff, Fredericksburg, VA (US); Jon Cameron Pouncey, Fredericksburg, VA (US)

(73) Assignee: United States of America, represented by the Secretary of the Navy, Arlington, VA (US)

( * ) Notice: Subject to any disclaimer, the term of this patent is extended or adjusted under 35 U.S.C. 154(b) by 146 days.

(21) Appl. No.: 18/096,626

(22) Filed: Jan. 13, 2023

(51) Int. Cl.
*H01P 5/12* (2006.01)
*H01P 1/165* (2006.01)
*H01P 5/103* (2006.01)
*H01P 11/00* (2006.01)

(52) U.S. Cl.
CPC ................ *H01P 5/12* (2013.01); *H01P 1/165* (2013.01); *H01P 5/103* (2013.01); *H01P 11/002* (2013.01)

(58) Field of Classification Search
CPC ............. H01P 5/12; H01P 5/103; H01P 1/165
USPC .......................................................... 333/137
See application file for complete search history.

(56) References Cited

U.S. PATENT DOCUMENTS

| | | | | |
|---|---|---|---|---|
| 4,673,899 | A * | 6/1987 | Jespersen et al. | H01P 5/12 333/137 |
| 6,242,984 | B1 * | 6/2001 | Stones et al. | H01P 5/12 333/125 |
| 7,385,462 | B1 | 6/2008 | Epp et al. | 330/53 |
| 7,432,780 | B2 | 10/2008 | Chan et al. | 333/127 |
| 11,233,306 | B1 | 1/2022 | Dressel et al. | H01P 5/082 |
| 12,034,215 | B1 | 7/2024 | Wilson et al. | H01Q 21/0056 |
| 2017/0271740 | A1 * | 9/2017 | Chieh et al. | H01P 5/08 |

FOREIGN PATENT DOCUMENTS

EP 0 499 514 B2 8/1992

OTHER PUBLICATIONS

P. Wade "Rectangular Waveguide to Coax Transition Design" 2006. https://vdocument.in/rectangular-waveguide-to-coax-transition-design.html.

* cited by examiner

*Primary Examiner* — Benny T Lee
(74) *Attorney, Agent, or Firm* — Gerhard W. Thielman

(57) ABSTRACT

An electromagnetic splitting coupler is provided for receiving a transverse electromagnetic (TEM) signal input and emitting a transverse electric mode one-zero ($TE_{10}$) signal output. The coupler includes a receiver port; a plurality of emitter ports; a hollow manifold; and a terminus. The receiver port provides the TEM signal input. The emitter ports impart the $TE_{10}$ signal output. The manifold includes a chamber that connects the receiver port to the emitter ports. The terminus seals the manifold. The coupler can also include an interface plate to connect the emitter ports thereto, such as to an antenna.

6 Claims, 12 Drawing Sheets

700

ELECTROMAGNETIC SPLITTING COUPLER COMPRISING A TEM SIGNAL INPUT PORT COUPLED TO PLURAL TE10 SIGNAL EMITTER PORTS THROUGH A HOLLOW MANIFOLD AND AN ACCESSIBLE FLANGE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to antenna waveguide manifold. In particular, the invention relates to a signal transition converter from coaxial transverse electromagnetic (TEM) feed to transverse electric one-zero ($TE_{10}$) mode rectangular waveguides.

Conversion of electromagnetic (EM) radiation often involves altering wave shape from the source to a transmission antenna. This can include transitioning from coaxial TEM mode to $TE_{10}$ mode for propagation.

SUMMARY OF THE INVENTION

Conventional EM couplers yield disadvantages addressed by various exemplary embodiments of the present invention. In particular, various exemplary embodiments provide an electromagnetic splitting coupler for receiving a transverse electromagnetic (TEM) signal input and emitting a transverse electric one-zero ($TE_{10}$) mode signal output. The coupler includes a receiver port; a plurality of emitter ports; a hollow manifold; and a terminus. The receiver port provides the TEM signal input. The emitter ports impart the $TE_{10}$ signal output. The manifold includes a chamber connecting the receiver port to the emitter ports. The terminus seals the manifold. Other various embodiments include an interface plate to connect the emitter ports, such as to an antenna.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout the detail description of the drawings, and in which.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in meters (m) or inches ("), mass in grams (g) or pounds-mass ($Ib_m$), time in seconds(s), angles in degrees) (°), force in newtons (N), temperature in kelvins (K), electric potential in volts (V), energy in joules (J), power in watts (W), signals in decibels (dB) and frequencies in hertz (Hz). Supplemental measures can be derived from these, such as density in grams-per-cubic-centimeters ($g/cm^3$), moment of inertia in gram-square-centimeters ($kg\text{-}m^2$) and the like.

Transition from a coaxial transverse electromagnetic (TEM) mode waveguide to a transverse electric mode ten ($TE_{10}$) rectangular waveguide involves design considerations that can be further complicated when conducted at high power. Exemplary embodiments provide an EM manifold is to evenly power divide and mode-convert from a single TEM mode coaxial high power input, with a high-amplitude low frequency carrier wave, to four $TE_{10}$ mode rectangular waveguide outputs. This disclosure describes a compact high-power split-output coaxial TEM to $TE_{10}$ mode converter (called "Splouper") to provide signal conversion as a signal converter from high power coaxial to rectangular waveguides.

The exemplary Splouper (splitting-coupler) connects to a high-power microwave source with a flanged coaxial port where the outer conductor terminates at the near wall of the device and the inner conductor terminates at the opposing wall. The coaxial TEM mode cable from the source mode converts and divides into four $TE_{10}$ rectangular waveguide modes and propagates down four separate waveguides connecting to external loads.

Figure 1A:
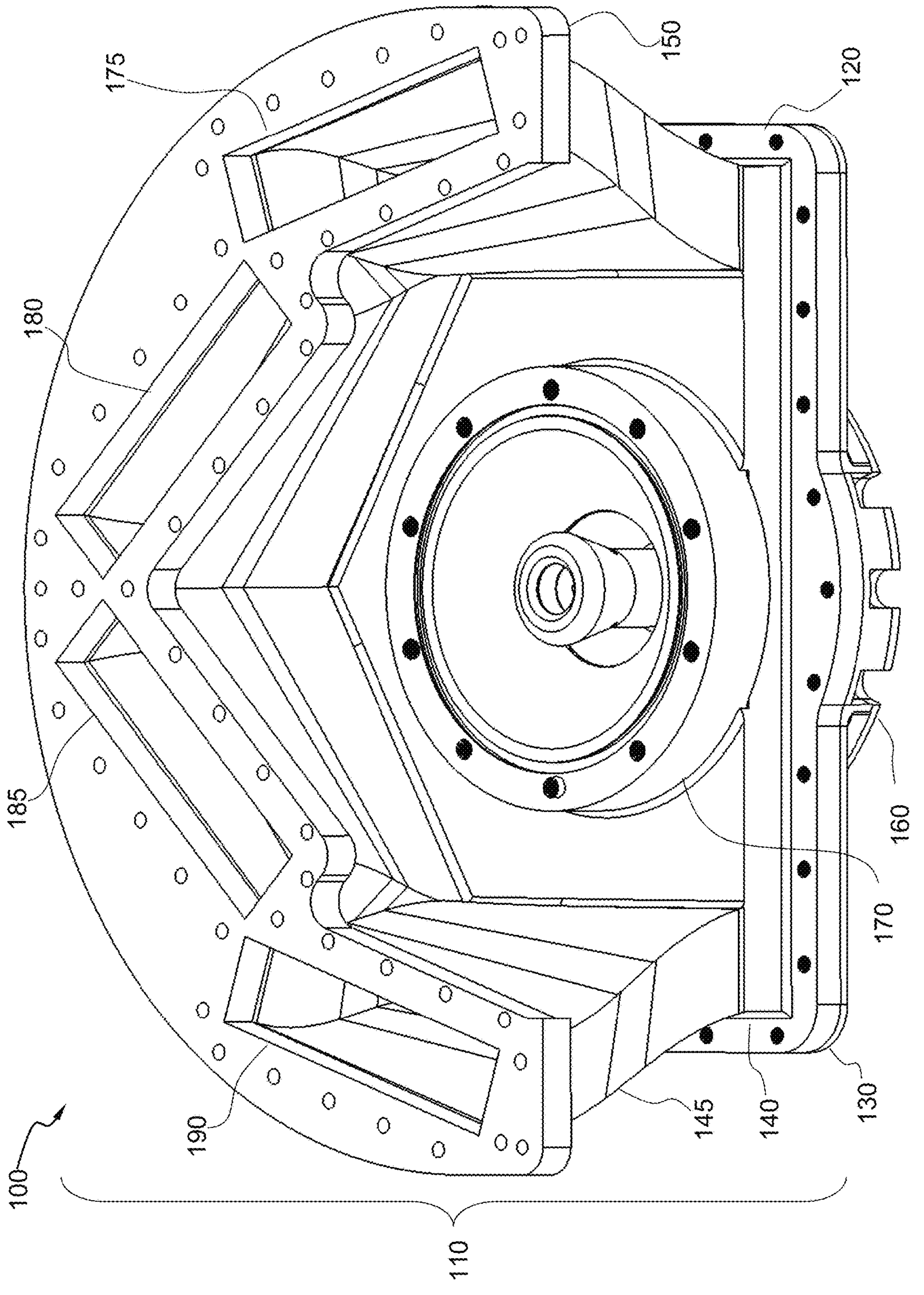
FIGS. 1A and 1B are isometric views of an exemplary splitting coupler.
Figure 1B:
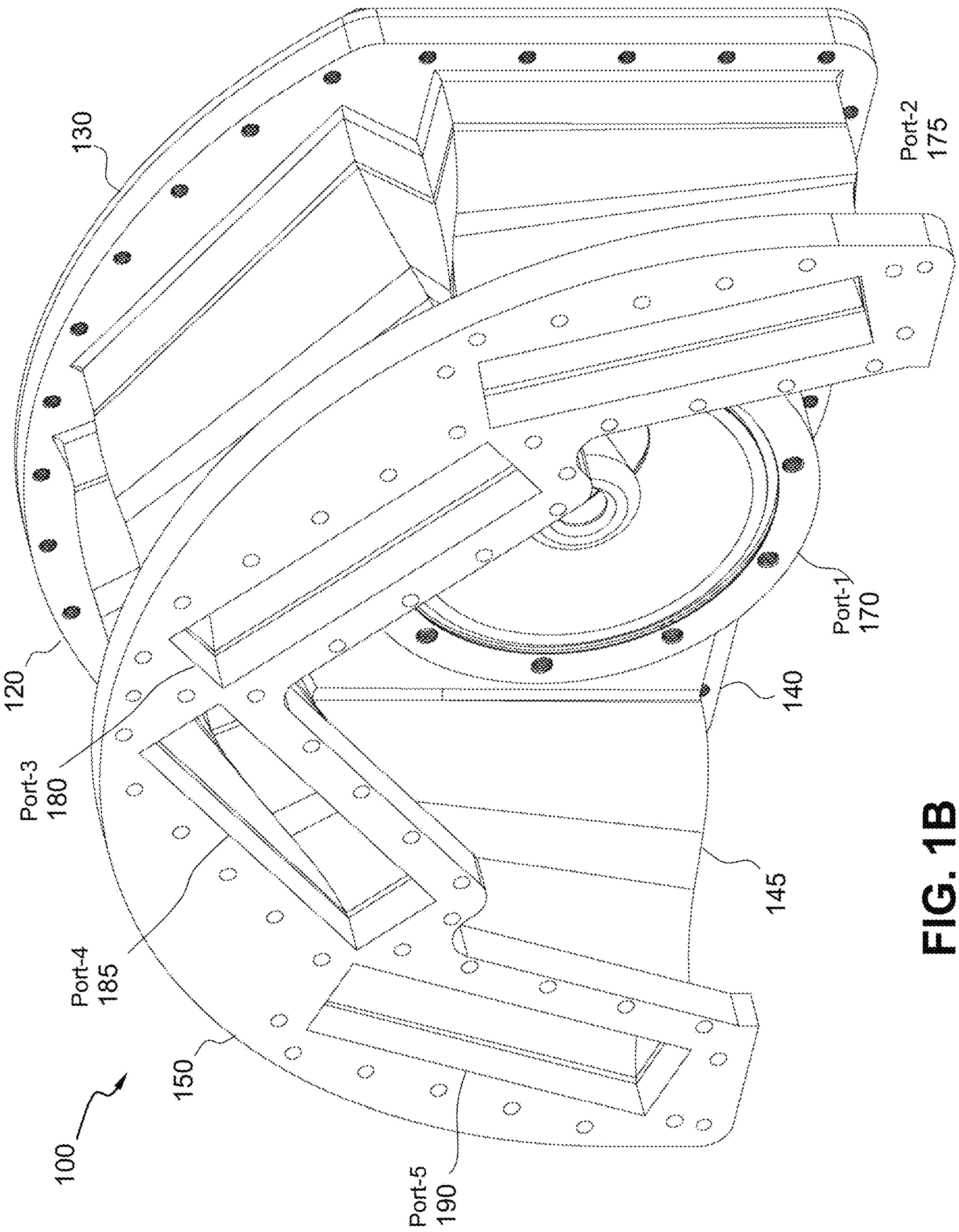

FIGS. 1A and 1B show an isometric assembly view 100 of the exemplary splitting-coupler 110 (FIG. 1A) or Splouper. A distal or base plate 120 together with a back plate 130 supports a hollow platform 140 from which extend a series of four chiral (i.e., mirror symmetric) conduit waveguides 145 having hollow rectangular cross-sections and attaching to an interface proximal plate 150. The base plate 120 forms a perimeter rim for the platform 140. A circular access flange 160 is disposed behind the back plate 130. The platform 140 also supports a circular input, which corresponds to Port-1 as horn 170. The output waveguides 145 are identified counter-clockwise from the far right as Port-2 175, Port-3 180, Port-4 185 and Port-5 190 and arranged in a semi-circular arc.

Figures 2A, 2B:
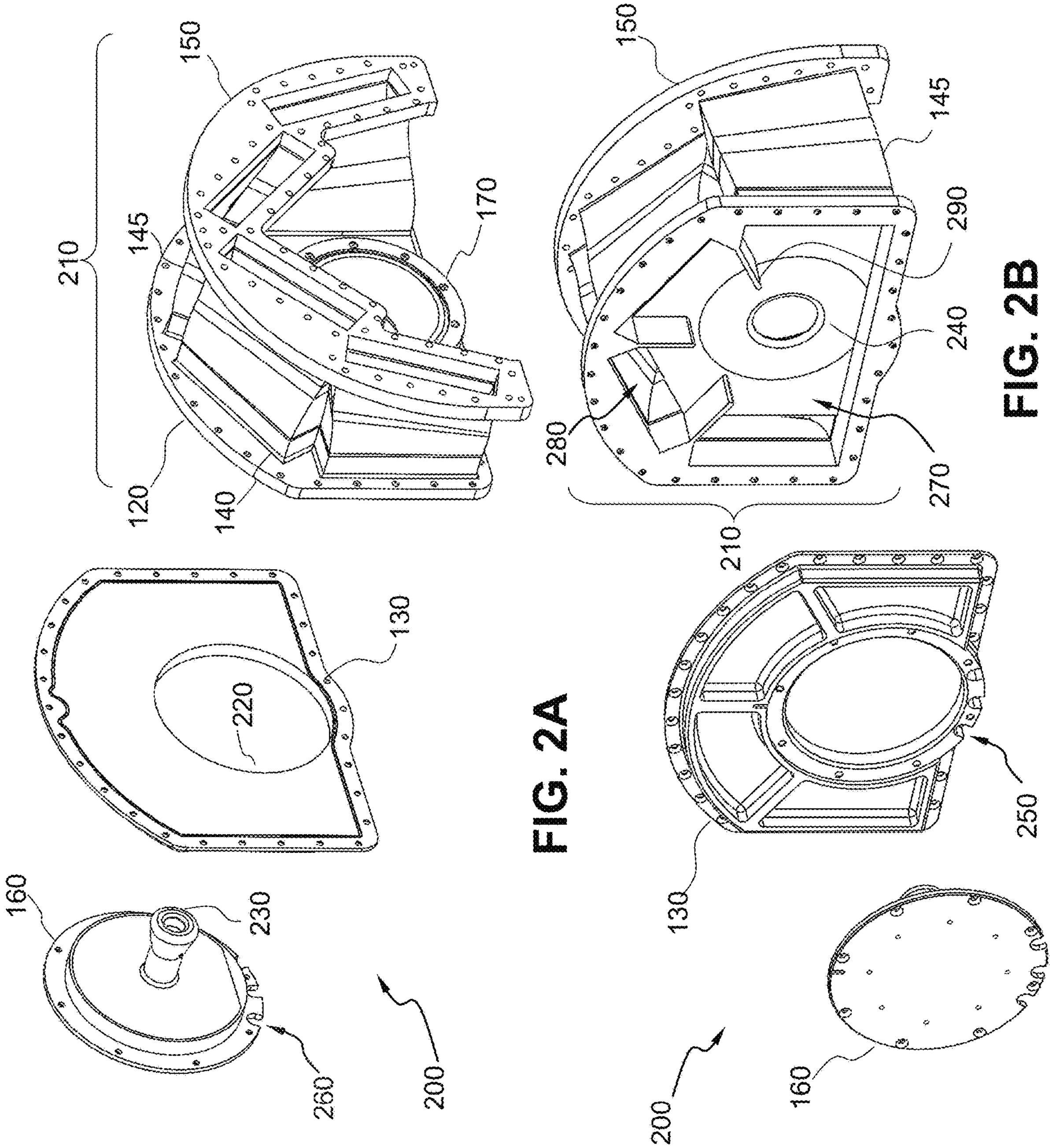
FIGS. 2A and 2B is are exploded isometric views of components of the splitting coupler.

FIGS. 2A and 2B show isometric exploded views 200 of components for the Splouper 110. The combination of base plate 120 (FIG. 2A), interface 150, platform 140 (FIG. 2A), waveguides 145 and horn 170 (FIG. 2A) comprise a manifold subassembly 210. The back plate 130 includes a circular hole 220 (FIG. 2A) into which the flange 160 inserts and from which a protrusion called a center conductor 230 (FIG. 2A) extends into the horn 170 through a circular hole 240 (FIG. 2B) in the platform 140. The manifold 210 has a length and height of 1.62" and 0.66", respectively. The Sploupler 110 has a mass of 32.7 $Ib_m$ when empty, being substantially composed of aluminum. The interior is filled with an additional 13.7 $Ib_m$ of transformer oil for a total mass of 46.4 $Ib_m$.

The back plate 130 and flange 160 further include respective arc cutouts 250 (FIG. 2B) and 260 (FIG. 2A) to receive screws. The base plate 120 opens (from its distal end) to a coupling chamber 270 (FIG. 2B) that defines a region connecting the hole 240 to rectangular passages 280 (FIG. 2B) in the waveguides 145. The chamber 270 is axially bounded by the inner surfaces of the back plate 130 and the flange 160 out to the parallel inner surface of the platform 140. The chamber 270 is laterally bounded by lateral inner walls of the platform 140. Each waveguide 145 forms the rectangular passage 280 that connects the platform 140 to the proximal plate 150, and enables electromagnetic waves to traverse from the chamber 270 to the passages 280.

Entries to the rectangular ports 175, 180, 185 and 190 are separated baffle walls 290 (FIG. 2B) to mitigate signal cross-talk within the chamber 270. These baffles 290 extend axially from back plate 130 to the parallel wall of the platform 140. A coaxial transmission line or cable (not shown) for providing input emission to be distributed by the manifold 210 connects to the center conductor 230. The back plate 130 and the flange 160 form the axial terminus of the Sploupler 110, while the interface plate 150 designates its axial projector.

Figure 3:
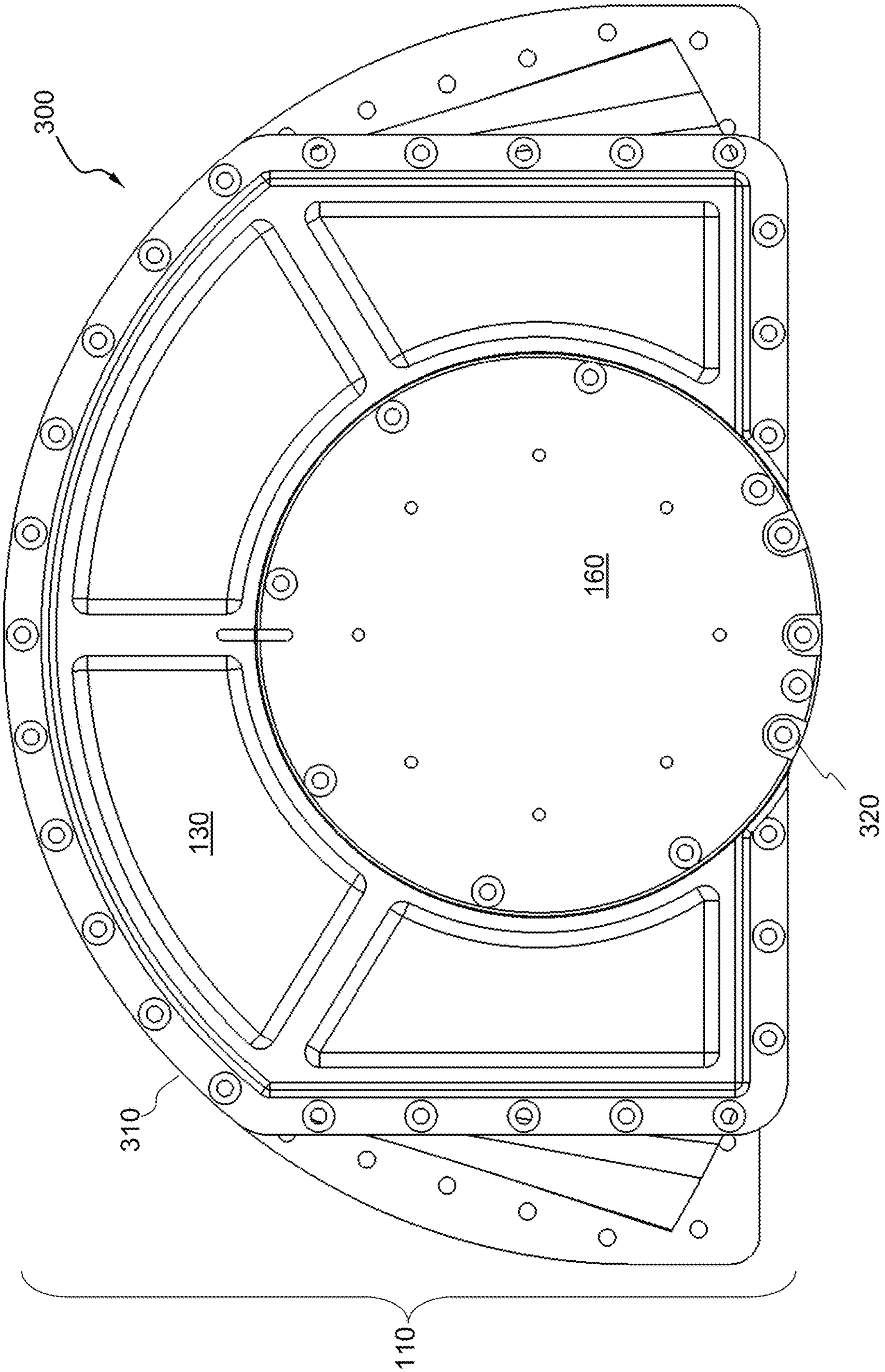
FIG. 3 is a plan view of the splitting coupler.

FIG. 3 shows a plan view 300 of the Sploupler 110 from underneath. Screws 310 insert into aligning holes along the peripheries of the back plate 130 and the flange 120 as shown in (FIG. 2A). Screws 320 further insert into aligning holes at corresponding cutouts 250 and 260 of the respective back plate 130 and flange 160. The back plate 130 can be removed from the base plate 120 for access of the chamber 270 to conduct internal maintenance, and the flange 160 can similarly be separated from the back plate 130 in the exemplary configuration. However, artisans of ordinary skill will recognize that the Sploupler 110 can combine the manifold 210, the back plate 130 and the flange 160 as a unitary item without departing from the spirit of the claims.

Figure 4A:
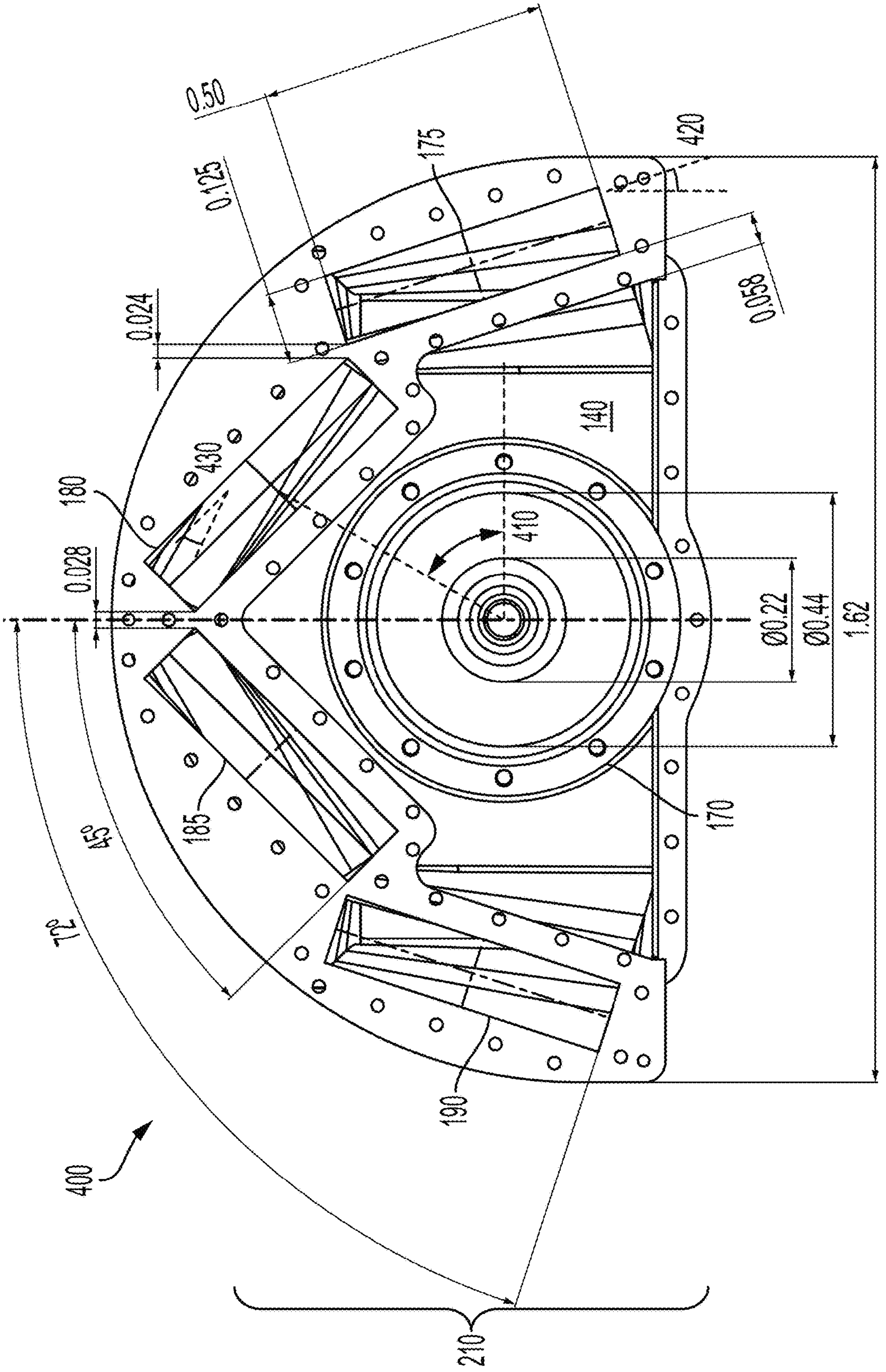
FIGS. 4A and 4B are plan views of a manifold.
Figure 4B:
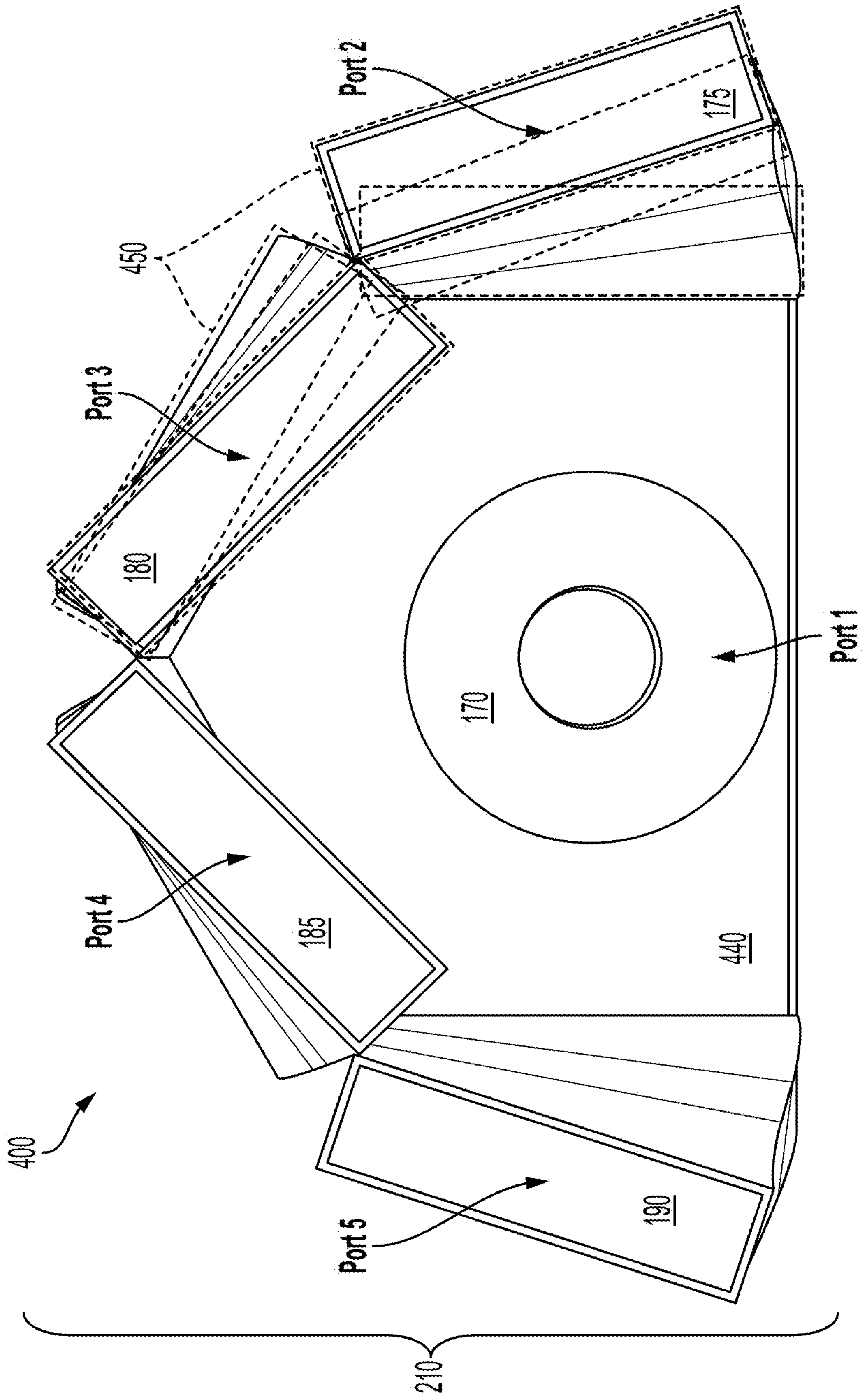
Figure 4C:
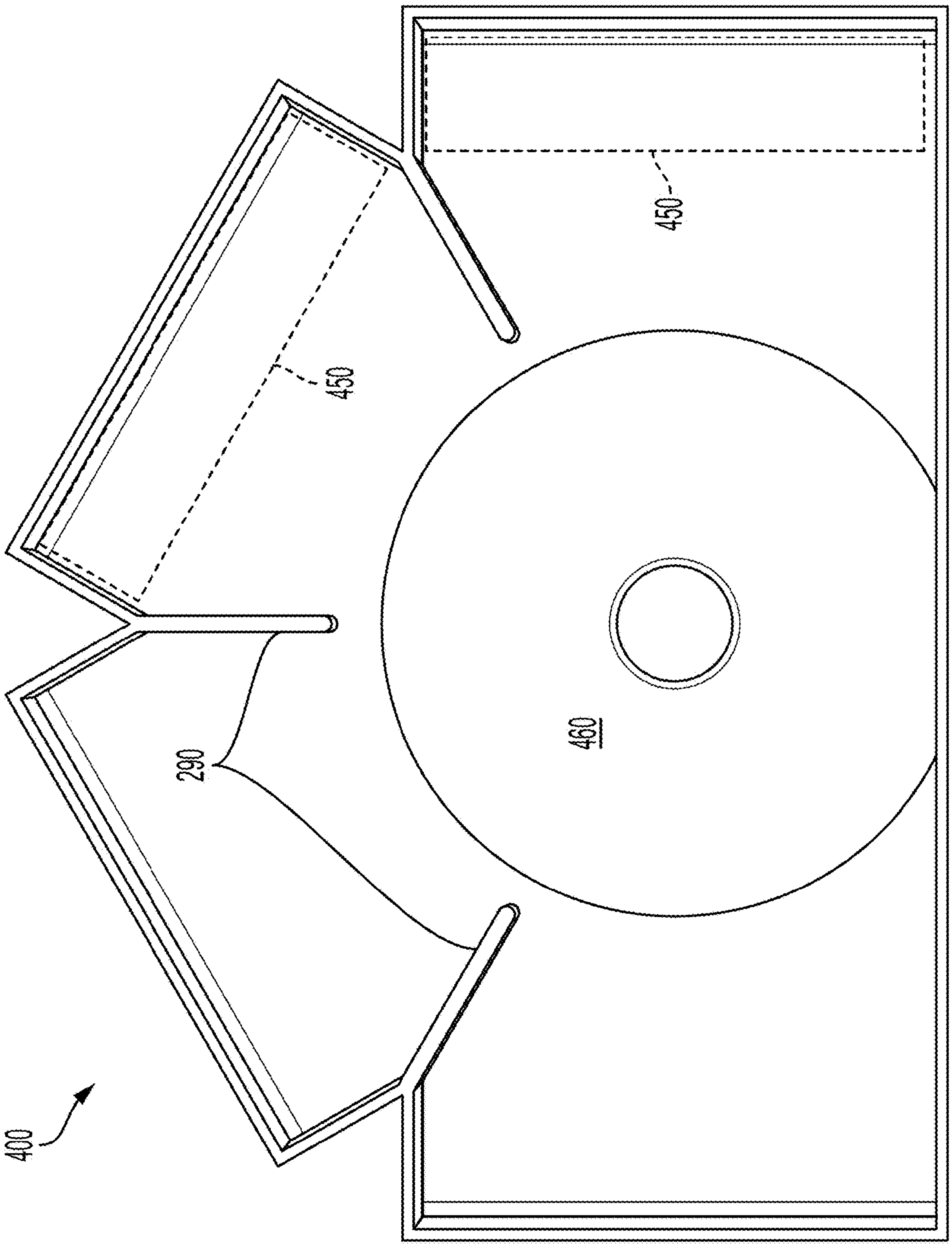
FIG. 4C is a plan view of the manifold's platform.
Figure 4D:
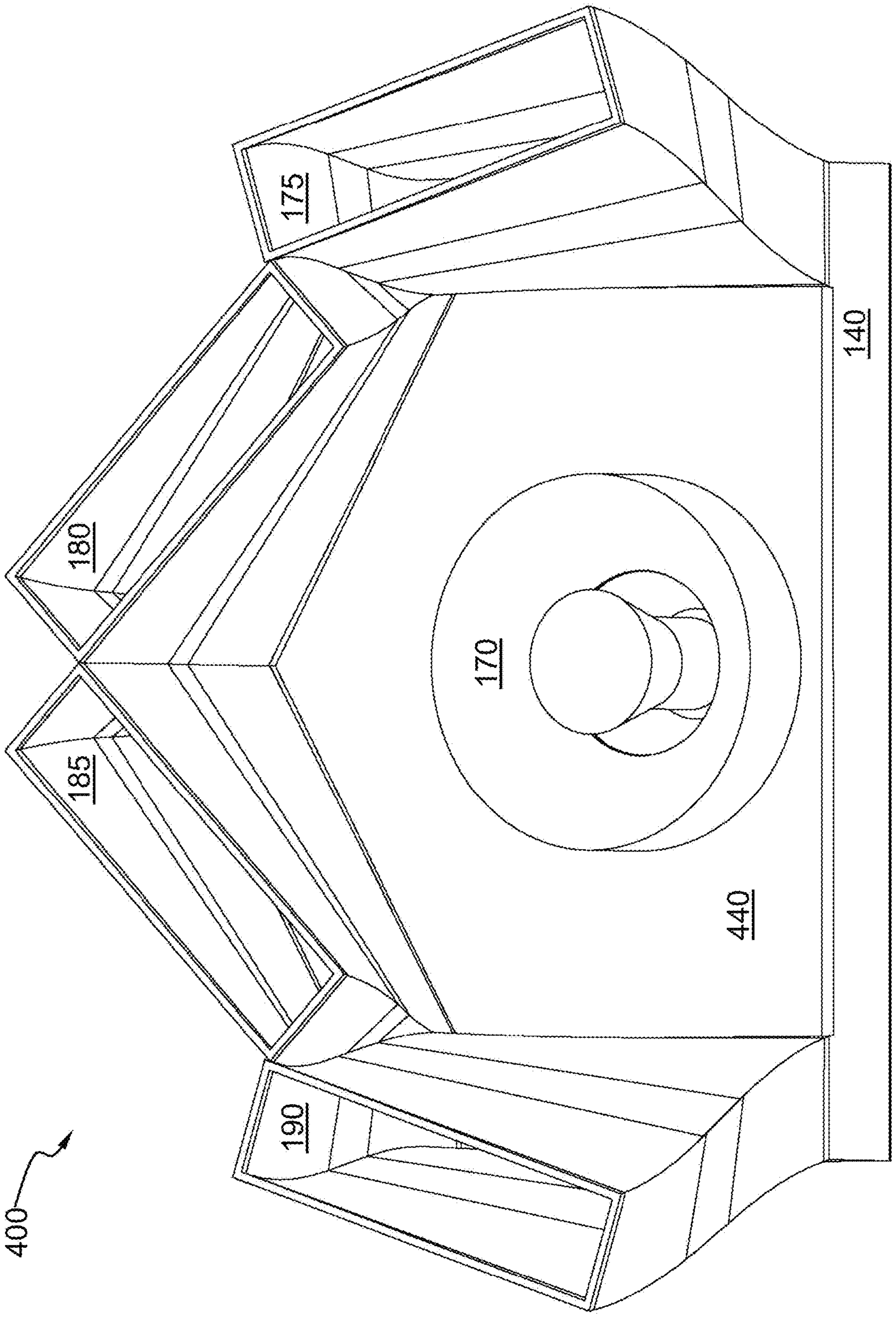
FIGS. 4D and 4E are isometric views of the manifold.
Figure 4E:
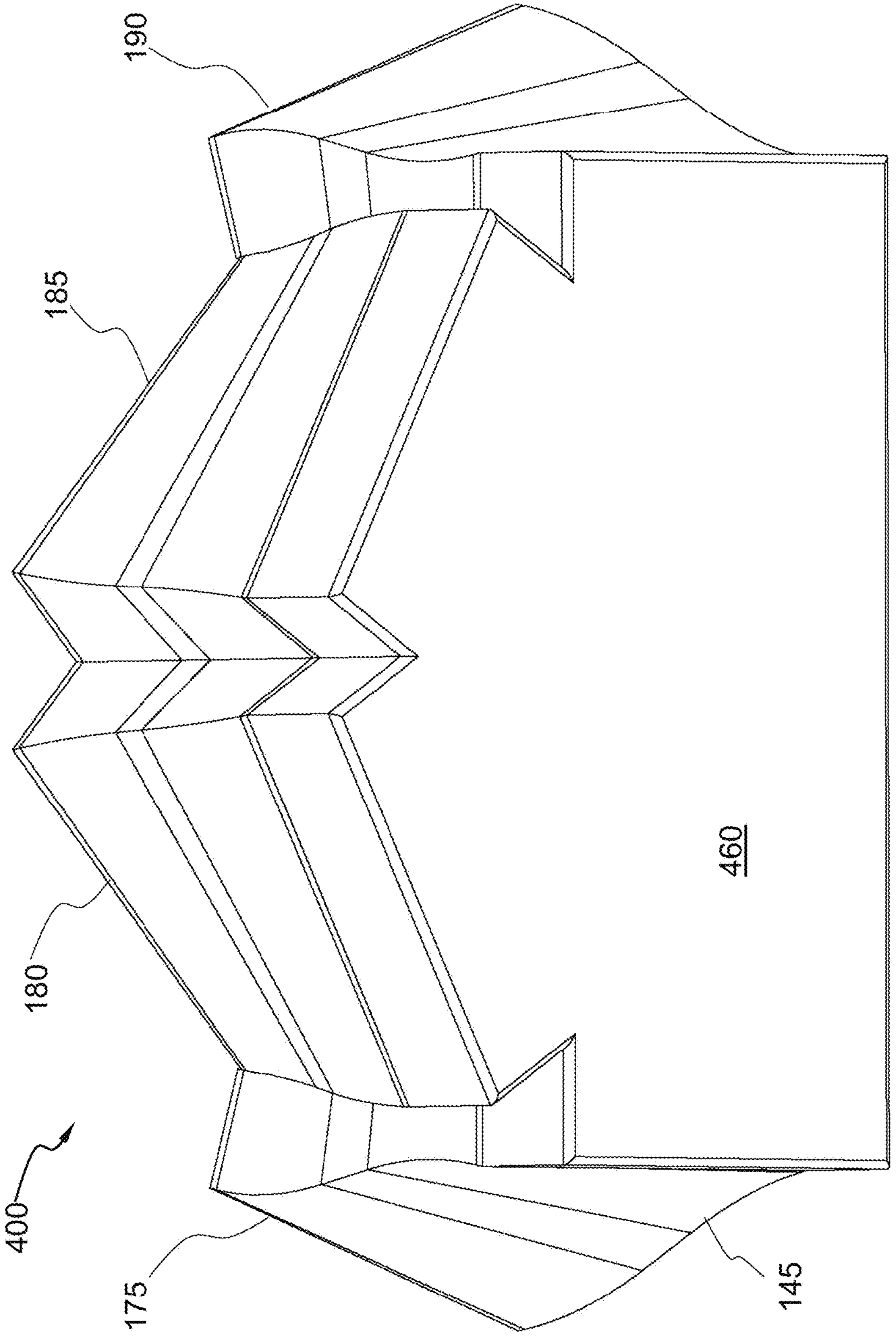

FIGS. 4A and 4B show plan views 400 of the manifold 210. FIG. 4A includes angles 410, 420 and 430. FIG. 4B includes an upper roof plate 440 of the platform 140 (FIG. 4A), and cross-sectional rectangles 450 of the ports 175, 180, 185 and 190. FIG. 4C shows a plan views 400 of a lower base plate 460 of the manifold's platform 140. FIGS. 4D and 4E show isometric views 400 of the manifold 210 (FIGS. 4A and 4B), respectively from obverse and reverse sides. The axial circular TEM input port 170 (FIGS. 4A, 4B and 4D) extends from the horn with protrusion 230 (FIG. 2A) beyond the platform 140 (FIGS. 4A and 4D).

The four corkscrew $TE_{10}$ output ports 175, 180, 185 and 190 with rectangular cross-sections 450 are set 60° apart as angle 410 at the platform 140. The waveguides 145 each twist 9° counterclockwise and 9° clockwise as angle 420 for outer ports 175 and 190, respectively, but 15° clockwise and 15° counterclockwise as angle 430 for the inner ports 180 and 185, respectively, while transitioning from base to interface plates 120 and 150.

Thus, at the interface plate 150, ports 175 and 180 are angularly separated by 27°, as are ports 185 and 190, while ports 180 and 185 are angularly separated by 90° from twisting the waveguides 145. Higher order TE modes can be accommodated by simply changing the dimensions of the waveguides to enable the frequency of the propagating microwaves to be above the cutoff frequency of the mode in question, which is a common practice for one skilled in the art of microwave propagation.

The rectangular $TE_{10}$ output ports 175, 180, 185 and 190 that extend from the chiral waveguides 145 are identified by port labels #2, #3, #4 and #5 as shown in FIG. 4B in the counterclockwise direction and terminate at the proximal plate 150, which can interface with a bracket of U.S. Pat. No. 12,034,215 (Navy Case 211231) that describes an antenna and incorporated herein by reference. (The channels of the '215 antenna correspond to Port-2 175. Port-3 180, Port-4 185 and Port-5 190.)

The rectangular channels of the waveguides 145 have inlet cross-section dimensions of 0.50" by 0.125" as intended for microwave emission. In the embodiment shown in views 400, the platform 140 with the base plate 120, input port 170 and output waveguides 145 comprise a unitary manifold 210, such as producible via additive manufacturing, also known as "three-dimensional printing" in public discourse.

For the configuration shown in FIG. 4A, the interface plate 150 has a span of 1.62", Port-1 170 has a diameter of 0.44", and the conductor 230 has a diameter of 0.22", with distance from the inner edge of the Port-2 175 through Port-5 190 from the inner edge of the plate 150 being 0.058". Span distances between Port-2 175 and Port-3 180 as well as Port-4 185 and Port-5 190 are each 0.024", while that between Ports-3 180 and Port-4 185 is 0.028". Artisans of ordinary skill will recognize that although the exemplary configuration described herein shows four output ports, this plurality represents a practical example, but is not limiting.

Figure 5:
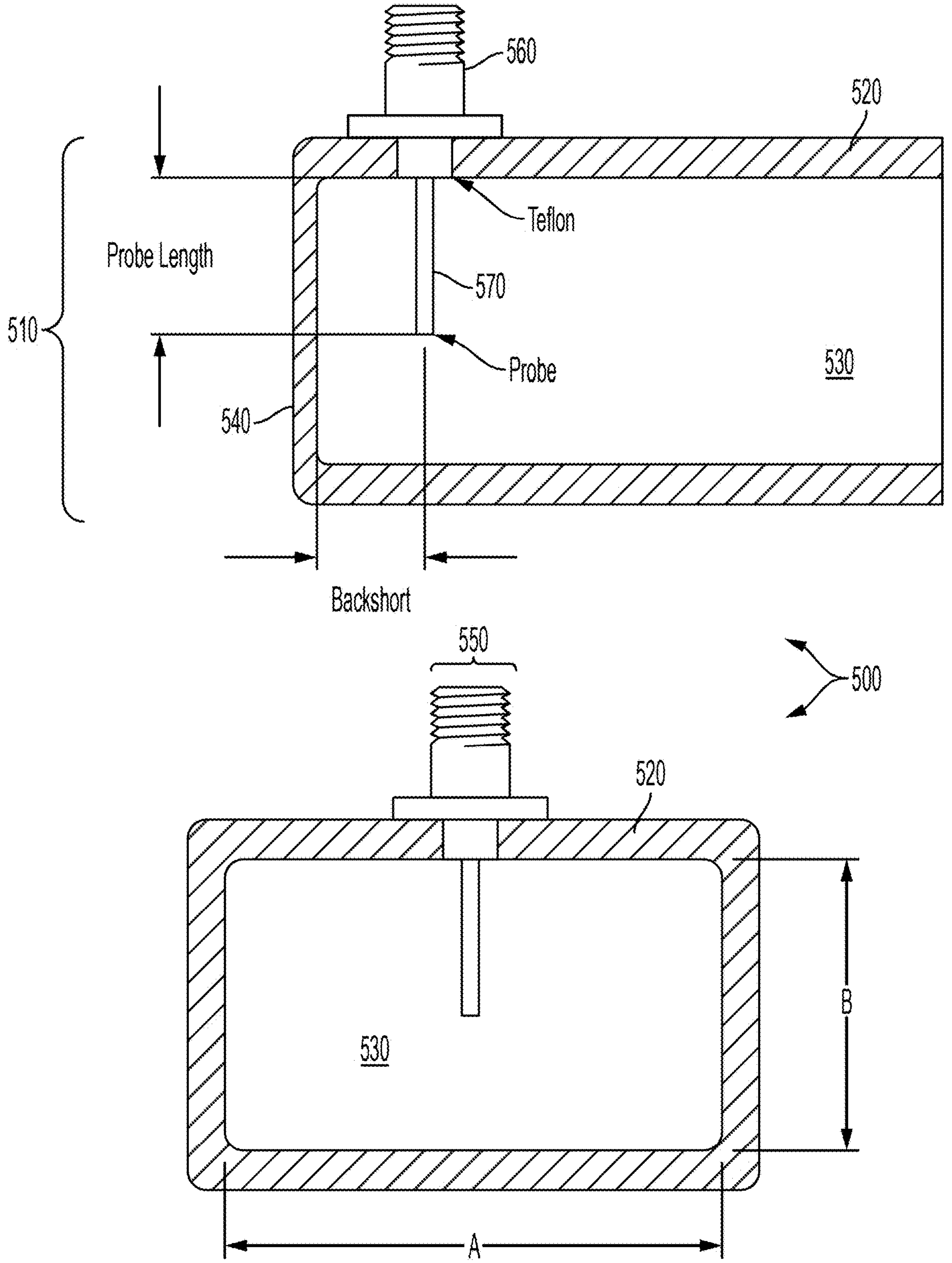
FIG. 5 is an elevation cross-section view of a conventional waveguide converter.

As related art, FIG. 5 shows a cross-section elevation views 500 of a standard (i.e., conventional) coaxial-to-waveguide coupler 510 as related art to convert coaxial TEM mode to rectangular waveguide $TE_{10}$ mode. A rectangular channel 520 defines a cavity 530 that ends at a back wall 540. The cavity 530 has interior "A" length and "B" width waveguide dimensions. An antenna 550 comprising a boss 560 that attaches to a probe 570 via a Teflon coated hole in the channel 520. The probe 570 has a specified probe length extending into the cavity 530 and set by a backshort distance from the back wall 540.

This configuration is described by P. Wade in "Rectangular Waveguide to Coax Transition Design", 2006 (see https://vdocument.in/rectangular-waveguide-to-coax-transition-design.html). Exemplary embodiments distinguish from this conventional design by ability to evenly subdivide energy to multiple waveguides, rather than a single waveguide.

Figure 6:
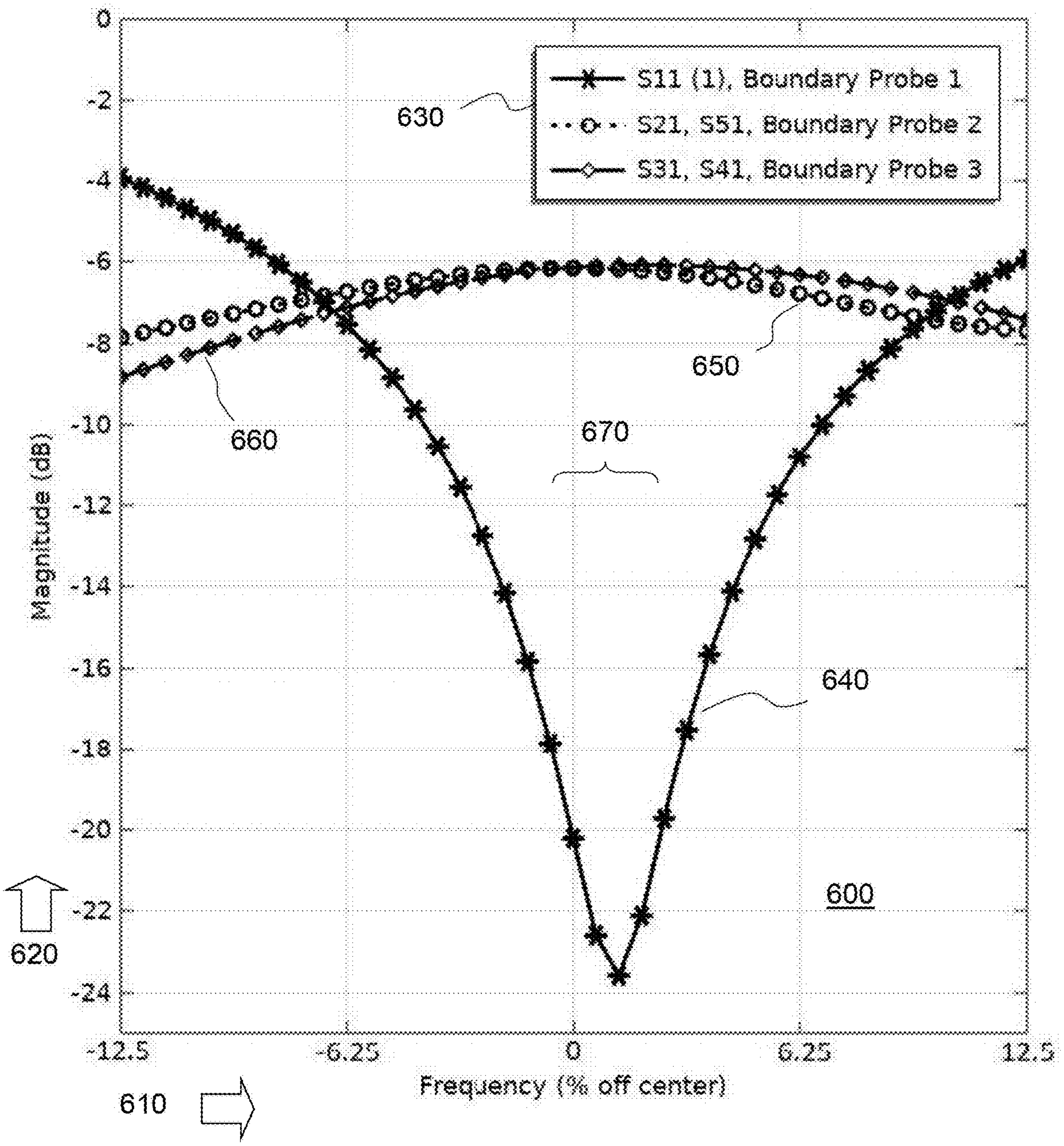
FIG. 6 is a graphical view of a signal magnitude versus frequency deviation.

FIG. 6 shows a graphical view 600 of scatter magnitude variation with off-center frequency deviation. The percentage off-center shift from center 610 denotes the abscissa, while magnitude 620 (dB) presents the ordinate. A legend 630 distinguishes traces between $S_{11}$ for the first boundary probe as traces 640; $S_{21}$, $S_{51}$ for the second boundary probe as traces 650; and $S_{31}$, $S_{41}$ for the third boundary probe as traces 660. A horizontal brace 670 (denoting an abscissa region) near the frequency distance center from shift 610 shows a magnitude decrease from −5 dB to −24 dB (minimum deviation) for $S_{11}$ from about +10% to about +1%. The subscripts reference row and column in the scatter matrix. Due to chiral symmetry, $S_{41}$ is equivalent to $S_{31}$ and $S_{51}$ is equivalent to $S_{21}$.

Traces 640 for the first boundary probe as $S_{11}$ correspond to input from Port-1 170. Traces 650 for the second boundary probe as $S_{21}$, $S_{51}$ correspond to output to Port-2 175 and Port-5 190, showing symmetrical right and left responses. Traces 660 for the third boundary probe as $S_{31}$, $S_{41}$ correspond to output to Port-3 180 and Port-4 185, also featuring symmetrical right and left responses. The dropoff of signal magnitude 620 within the frequency region of traces 640 denoted by brace 670 demonstrates suppression of the input carrier signal, thereby reducing extraneous interference to the output waveguides 145.

Figure 7A:
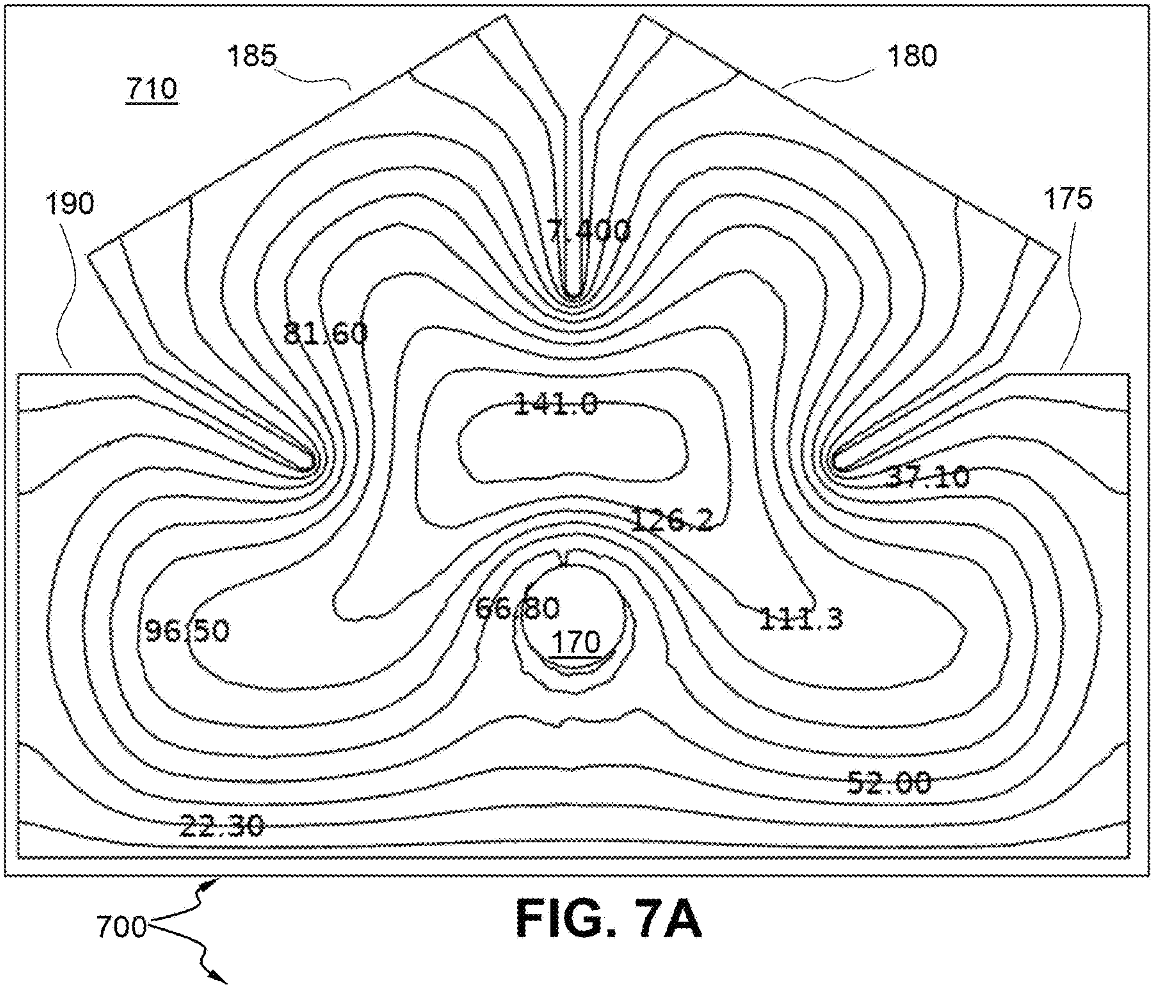
FIGS. 7A and 7B are contour views of manifold field strength.
Figure 7B:
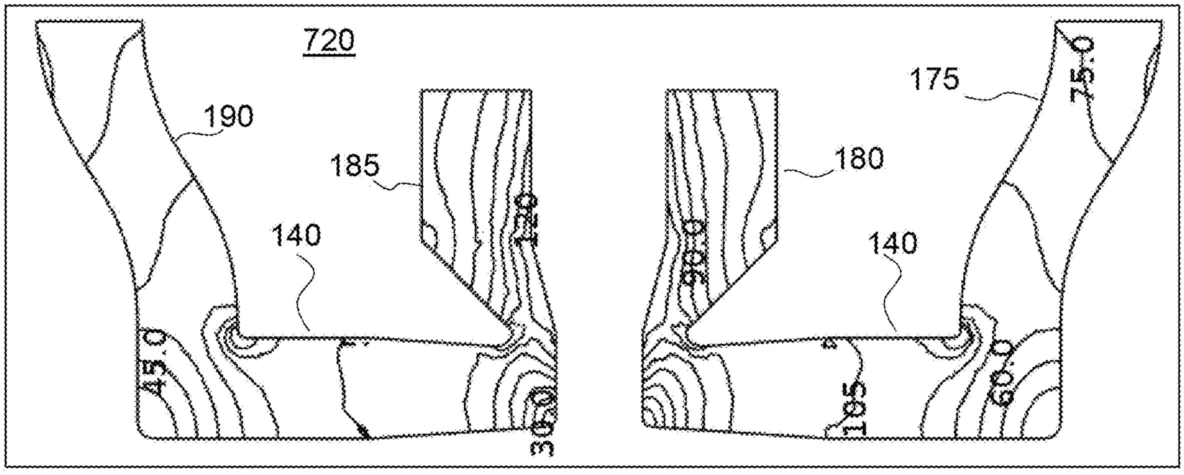

FIGS. 7A and 7B show plan and elevation cross-section contour-line views 700 of levels of constant electric potential field strength for the five ports 170 (FIG. 7A), 175, 180, 185 and 190 as plan plot 710 (FIG. 7A) and elevation plot 720 (FIG. 7B). Concentric coutours within Sploupler geometric boundaries denote E-field iso-potential strength in kilovolts-per-centimeter (kV/cm). Values identified include 7.4 kV/cm, 22.3 kV/cm, 37.1 kV/cm, 52.0 kV/cm, 66.8 kV/cm, 81.6 kV/cm, 96.5 kV/cm, 111.3 k V/cm 126.2 kV/cm and 141.0 kV/cm in FIG. 7A; as well as 30 kV/cm, 45 kV/cm, 60 kV/cm, 75 kV/cm, 90 kV/cm, 105 kV/cm and 120 kV/cm in FIG. 7B.

This enables frequency domain E-field stress analyses to visualize power handling capability. A finite element analysis (FEA) solution of the normalized E-field inside the chamber at a power level of 1 GW in the frequency domain. The E-field maximum is 144 kV/cm in the cross-section of the mode conversion chamber (left) and 120 kV/cm at the corners of the coaxial input and immediately around the center conductor 230. These field lines vary in magnitude from 52 kV/cm at the port peripheries to 141 kV/cm near the center of the platform 140 between ports 170, 180 and 185.

The interior of the Splouplet 110 has been carefully designed to produce equal powers and controlled phases across the output ports in the $TE_{10}$ mode. The exemplary conversion device is capable of handling in-band microwave input power in excess of 1 GW by designed management of the electric fields within the converter and inclusion of dielectric liquid insulation. The use of dielectric insulation with $\varepsilon_r>1$ also reduces the dimensions of the converter compared to a vacuum or gaseous insulated design. The exemplary device is designed to withstand and reject out-of-band, lower frequency carrier waves at powers exceeding 10 GW.

Efficient transmission and mode conversion of radio frequency (RF) power from a high power microwave (HPM) source to the load is a critical stage of an HPM system. Most HPM sources are vacuum tubes which interact with electron beams, to produce output modes in the transverse electric (TE) or transverse magnetic (TM) orientations. Recent HPM source development has led to devices which produce high powers in coaxial transverse electromagnetic (TEM) modes. Within the HPM industry, a need has developed for a device to convert the coaxial TEM mode to a mode capable of being radiated by a linearly polarized antenna.

This disclosure provides an exemplary wideband mode converter and power divider with a single coaxial TEM input as port 170, having a center axis collinear with the center conductor 230 of the coaxial input, split into four quadrants and connected to four rectangular waveguides as ports 175, 180, 185 and 190. The HPM source produces a greater than 1 GW power output in the coaxial TEM mode, which rides on the envelope of an even larger amplitude carrier wave.

The exemplary Splouplet 110 was designed to equally split power and couple between the single source and the four slotted waveguide loads while rejecting the out-of-band carrier wave. Consequently, the axial port 170 represents a feed input, while the rectangular ports 175, 180, 185 and 190 present output waveguides.

The Splouplet 110 was first conceived as an attempt to convert a standard coaxial-to-waveguide coupler into a power-dividing structure for a distributed load. To develop the exemplary design for the Splouplet 110, a standard coaxial to waveguide coupler geometry was rotated 180° about the center conductor 230 of the coaxial input, producing a semi-circular central coupling chamber 270. The center conductor 230 has been shunted to the opposing chamber wall 280 and four waveguide paths 145 were connected to the coupling chamber 270, spaced 60° apart and on the same side of the semi-circular cross section as exemplified by the geometry of the interface plate 150.

Between the base and interface plates 120 and 150, these ports yield a pentagonal cross-section, spanning from top-to-bottom in a radial pattern between the waveguide sections. The positions of these wall conduit waveguides 145 impose boundary conditions on which modes can exist in the chamber 270 by providing conductive surfaces to shape the E-fields through Gauss' Law. These facilitated the mode conversion into four $TE_{10}$ modes thereby.

The lengths of the interior walls determine how the power is split between the four waveguide output ports 175, 180, 185 and 190. These ports were carefully adjusted to achieve an even balance between them across the frequency band. The newly converted $TE_{10}$ mode EM waves travel along the waveguides as conduit waveguides 145, which turn 180° back towards the direction of the input port 170 to interface with the load array of the output ports. An initial 90° turn naturally occurs where the center conductor 230 terminates on the opposing roof of chamber 270. This turn propagates the RF perpendicular to the center conductor 230, while the waveguides 145 perform the second 90° turn for a total of 180° signal redirection.

Ultimately, the Splouplet 110 simultaneously couples between one coaxial TEM mode and four rectangular waveguide $TE_{10}$ modes, equally divides power between the four rectangular conduits as waveguides 145, and redirects the $TE_{10}$ modes backwards in the opposite direction of the input as port 170. A physics-level design of the device is displayed in contour plots 710 and 720. A computer-aided design (CAD) model to visualize the Splouplet 110, a cross-section exposing the coupling chamber 270 with the interiors of the waveguides 145.

The output power of the HPM source also imposes a power handling requirement on the Splouplet 110. The configured device needs to withstand levels of RF power in the gigawatt regime (≥1 GW). This is achieved through dielectric loading of the interior volume and shaping of sharp edges and corners. The dielectric chosen is a commercially available transformer oil ($\varepsilon_r=2.3$) for its low loss and high dielectric breakdown voltage.

The Splouplet 110 experiences a maximum E-field stress inside the mode converting chamber of 144 kV/cm and a maximum E-field stress along the walls of the input port of 120 kV/cm. In air and under a static direct current (DC) field, these could be problematic values for electrical breakdown (threshold of ≥30 kV/cm), but the present dielectric load and the short pulse input are expected to be sufficient to prevent breakdown.

Port naming conventions and S-parameters can be viewed in view 100 (FIG. 1A), which demonstrates the power reflection and balance between the output ports across a relevant band. The −10 dB of the $S_{11}$ bandwidth, signifying a region of high performance and low reflection, is approximately 10.5%. In this region, the output power of Port-2 175 and Port-5 190 compared to Port-4 185 and Port-3 180 differs by 2.5% at most. These results display exceptionally high levels of power balance and low levels of reflection within the band. This wide band performance is necessary, as the Sploupler 110 is designed to handle a short pulse input. View 400 (FIG. 4B) displays port layout and naming convention.

The present disclosure also includes a method of fabrication for the exemplary Sploupler 110. A computer aided design (CAD) model depicting a manufacturable Sploupler is featured in views 100 and 300. The Sploupler 110 has been manufactured using a combination of aluminum additive manufacturing for the main body, including the waveguides, along with computer numerical control (CNC) milling and lathe cutting for the removable back plate 130 and center conductor 230.

The design approach of the Sploupler 110 can be used to create compact, high power, splitting couplers for a variety of TEM fed HPM applications and is capable of scaling across a variety of source operation frequencies and power levels. Such a device could be applicable across a range of industries that utilize high power microwave radiation including but not necessarily limited to: radar and communications along with laboratory research and development (R&D), industrial microwave heating systems, power beaming and/or transfer.

The exemplary Sploupler 110 has been instrumental in the success of a directed energy effort at Naval Surface Warfare Center, Dahlgren Division. Further development facilitates potential mass production of the device to fulfill design requirements. Additionally, the HPM source and load that the exemplary device was designed to couple between are early in their development and further improvements may benefit from future innovation.

Effective and efficient mode conversion and gigawatt-class power division to four co-located outputs across a wide frequency band capable of conforming to a hemispherical geometry. The flexible design process for the Sploupler 110 can be modified in the future to supply power to various numbers of outputs and different frequency ranges without departing from the scope of the claimed features.

The closest alternative having similarity to the exemplary Sploupler 110 are designs for RF mode converters and power dividers (e.g., U.S. Pat. Nos. 11,233,306, 7,432,780 and 7,385,462 and European Patent EP 0,499,514). These disclosures feature mode conversion and/or power dividing devices for microwave and RF applications, but fail to teach a coaxial TEM input to $TE_{10}$ waveguide outputs. There is especially no mention in the prior art of a device featuring multiple or all of these capabilities, while also handling wideband input and gigawatt levels of peak power. This constitutes a novel power regime for HPM in recent years.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An electromagnetic splitting coupler for receiving a transverse electromagnetic (TEM) signal input and emitting a transverse electric mode ten ($TE_{10}$) signal output, said coupler comprising:

- a receiver port that provides the TEM signal input;
- a plurality of emitter ports that impart the $TE_{10}$ signal output;
- a hollow manifold that includes a chamber to connect said receiver port to said plurality of emitter ports; and
- a back plate that seals said hollow manifold, said back plate having an access flange.

2. The coupler according to claim 1, wherein said receiver port has an interface for a coaxial transmission line.

3. The coupler according to claim 1, wherein each emitter port of said plurality of emitter ports comprises a rectangular cross-section conduit.

4. The coupler according to claim 1, further including an interface plate to connect said plurality of emitter ports thereto.

5. The coupler according to claim 4, wherein each emitter port of said plurality comprises a rectangular cross-section conduit that twists between said manifold and said interface plate.

6. The coupler according to claim 1, wherein said plurality of emitter ports arranges within a semi-circular arc.

* * * * *